United States Patent
Reuser et al.

(10) Patent No.: US 7,811,046 B2
(45) Date of Patent: Oct. 12, 2010

(54) DUAL-COMPARTMENT TRAILER WITH FRONT AND REAR LIVE FLOORS

(76) Inventors: Bruce Reuser, 370 Santana Dr., Cloverdale, CA (US) 95425; John Reuser, 370 Santana Dr., Cloverdale, CA (US) 95425

( * ) Notice: Subject to any disclaimer, the term of this patent is extended or adjusted under 35 U.S.C. 154(b) by 735 days.

(21) Appl. No.: 11/679,050

(22) Filed: Feb. 26, 2007

(65) Prior Publication Data

US 2007/0200382 A1 Aug. 30, 2007

Related U.S. Application Data

(60) Provisional application No. 60/776,360, filed on Feb. 24, 2006.

(51) Int. Cl.
*B65F 3/00* (2006.01)
(52) U.S. Cl. .............. 414/525.9; 414/545; 414/813; 198/750.2
(58) Field of Classification Search ........... 414/545, 414/546, 525.9, 813; 198/750.2
See application file for complete search history.

(56) References Cited

U.S. PATENT DOCUMENTS

| | | | | |
|---|---|---|---|---|
| 3,998,343 A | * | 12/1976 | Fors | 414/501 |
| 4,642,018 A | * | 2/1987 | Leroux et al. | 414/502 |
| 4,858,748 A | | 8/1989 | Foster | |
| 4,896,761 A | | 1/1990 | Foster | |
| 5,222,593 A | | 6/1993 | Quaeck | |
| 5,325,957 A | | 7/1994 | Wilken | |
| 5,364,223 A | * | 11/1994 | Bissex | 414/526 |
| 5,560,472 A | | 10/1996 | Gist | |
| 6,006,896 A | * | 12/1999 | Foster | 198/750.5 |
| 2005/0163584 A1 | * | 7/2005 | Clark | 410/135 |

OTHER PUBLICATIONS

Keith Walking Floor Unloading System (brochure); Keith Manufacturing Company; 8 pages.
How the Keith Walking Floor System Works (web pages from www.keithwalkingfloor.com—4 pages); Feb. 28, 2005.
HALLCO MFG. Company, Inc. (brochure—Hallco-Glide Live Floors "Owners Manual").

* cited by examiner

*Primary Examiner*—Gregory W Adams
*Assistant Examiner*—Willie Berry
(74) *Attorney, Agent, or Firm*—Craig M. Stainbrook; Stainbrook & Stainbrook, LLP

(57) ABSTRACT

A bifurcated, dual-compartment trailer having a front storage compartment and a rear storage compartment, each having a power driven live floor. The storage compartments are selectively separated by a moveable or openable partition having a closed position and an open position. In the closed position the partition divides the front compartment from the rear compartment and provides a barrier that prevents bulk material contained in either compartment from mixing with bulk material in the other compartment. The trailer includes a rear door, and when opened, the rear compartment may be unloaded using the rear live floor, after which the partition may be opened and the front compartment unloaded using both the front and rear live floors.

3 Claims, 3 Drawing Sheets

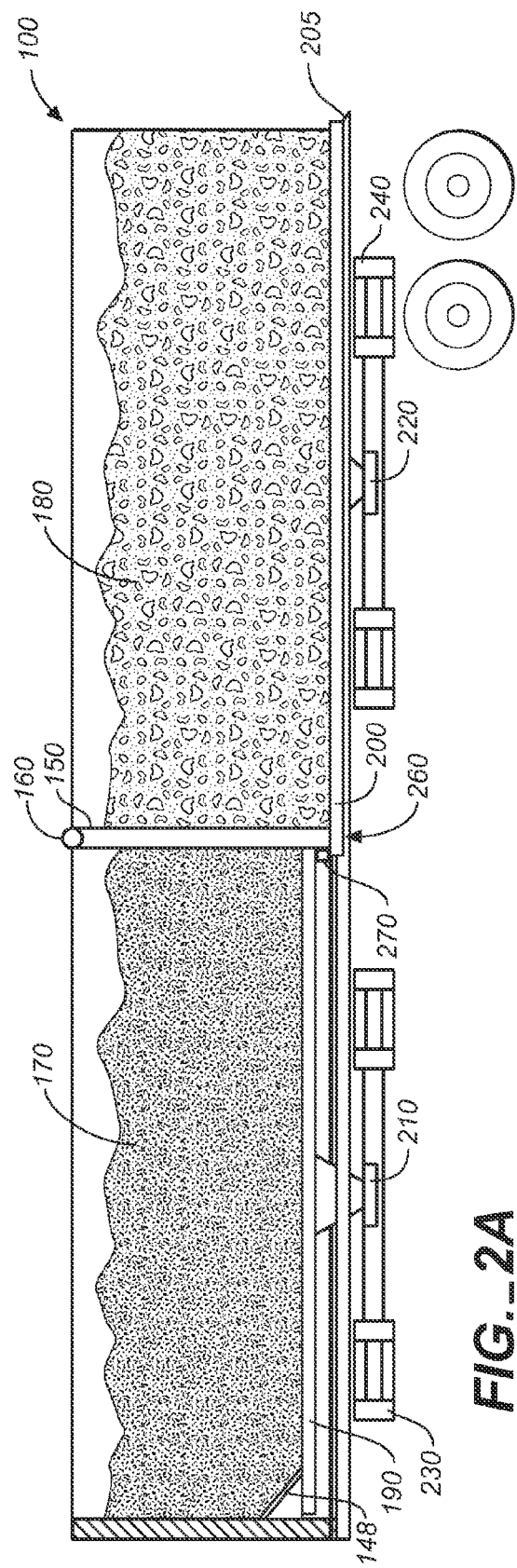
FIG._2A
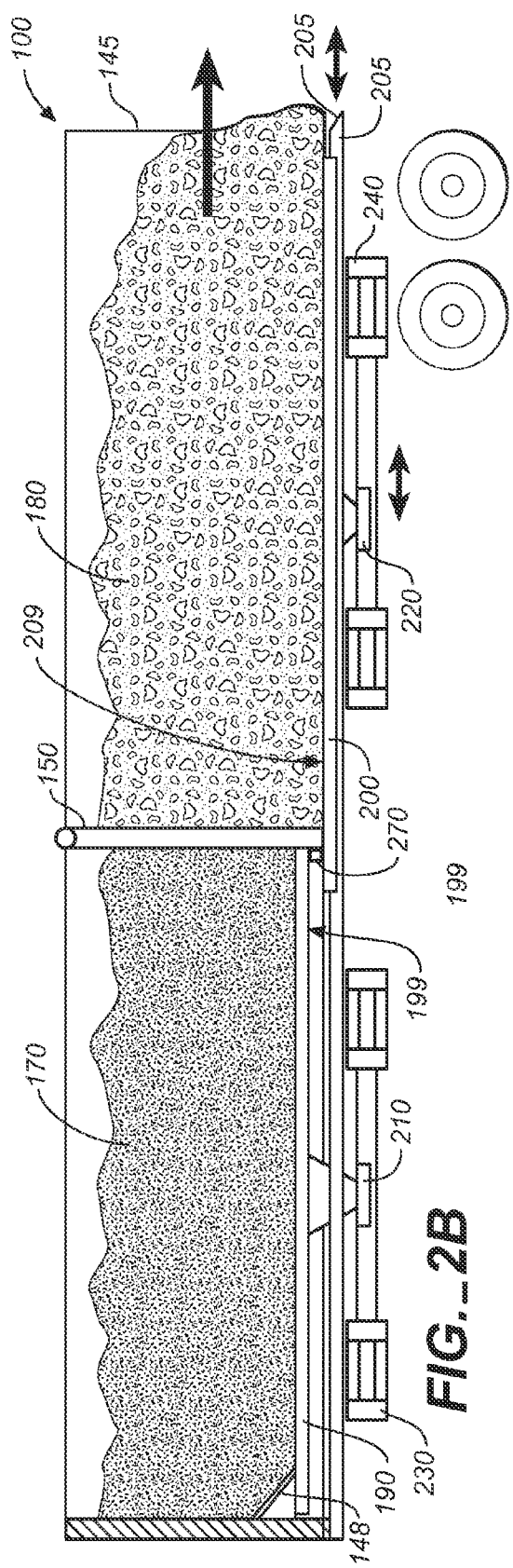
FIG._2B

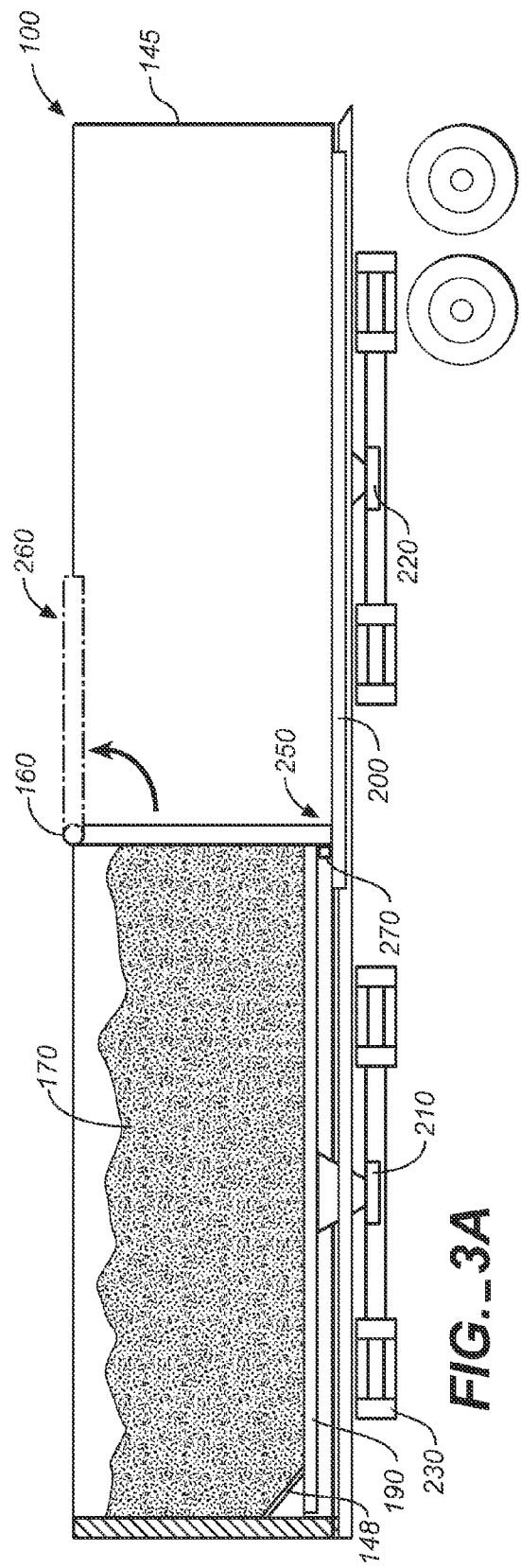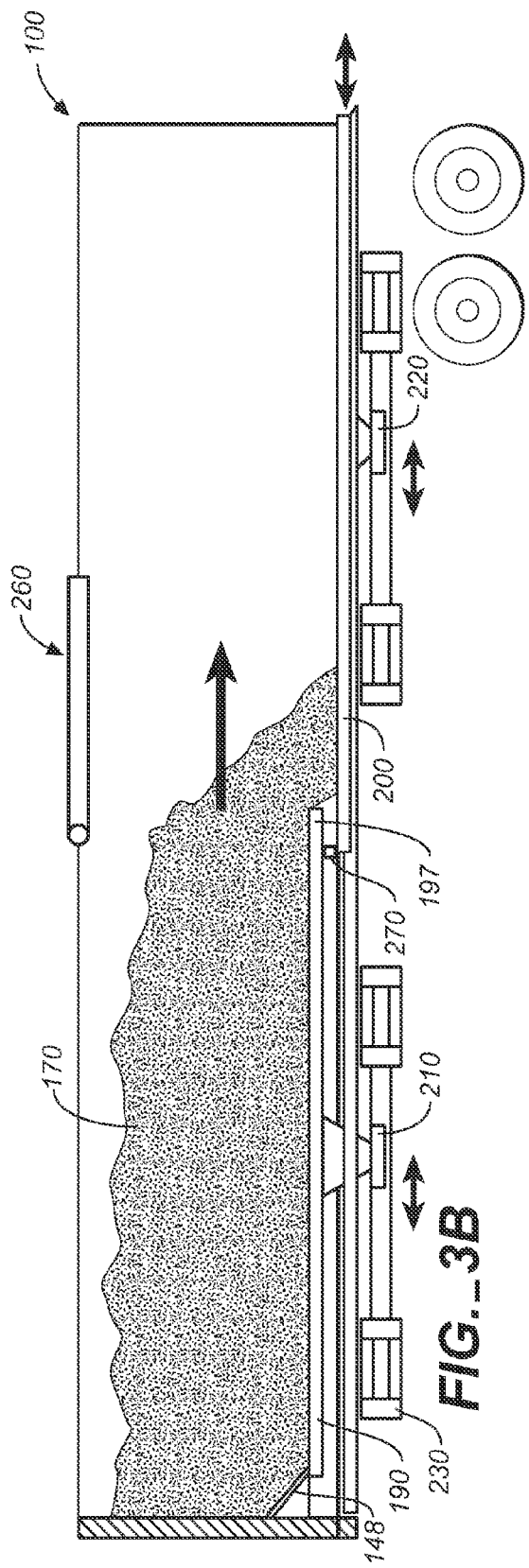

DUAL-COMPARTMENT TRAILER WITH FRONT AND REAR LIVE FLOORS

CROSS REFERENCES TO RELATED APPLICATIONS

The present application claims the benefit of U.S. Provisional Patent Application Ser. No. 60/776,360, filed Feb. 24, 2006 (Feb. 24, 2006).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to conveying systems, and more particularly to reciprocating conveyors for semi-trailers, and still more particularly to a trailer having front and rear compartments, each with a moving slat reciprocating conveyor or live floor.

2. Discussion of Related Art Including Information Disclosed Under 37 CFR 001.97, 1.98

The installation and use of moving slat reciprocating conveyors, also known as live floors and/or walking floors, is well known. These conveyors are widely employed in material handling systems and in semi-trailers to address commercial challenges in storing and transporting bulk particulate materials—which, as used in the instant application, means such things as produce, particulate material of various kinds, including grain, hay, seed, livestock feed and fodder, sawdust, wood chips, mulch and compost, gravel, small rocks, fertilizer and other powdery substances, manure, refuse, and the like.

Live floors have found their broadest application in the loading and unloading of open end box-like enclosures (trailers, bins, silos, and storage containers, for example). Such structures pose a problem for front end loaders in moving bulk material into and out of the enclosure. Accordingly, one solution has been to provide a conveyor system within the enclosure that typically comprises a series of hydraulically powered floor slats in a side-by-side disposition to form a floor. Each of the slats is fabricated from aluminum, formed steel, or a lightweight alloy.

The general principle of operation for a partially enclosed live floor relies on friction, and can be stated simply: The weight and friction of a material on the surface area of two slats exceeds the weight and friction of a material on a third slat. Accordingly, a single slat can be moved underneath bulk material without appreciably moving the mass as a whole, as the other two slats hold the material in place. When all of the slats have been moved independently beneath the material away from the direction in which it is desired to move the material, they can then be moved in unison in the direction of unloading, thereby conveying the material. The timed sequence of the reciprocating movements ensures that nearby neighboring slats do not move together when moving in the direction from which the bulk material is to be moved, whereas they do move in unison to move material in the desired direction. Slat dimensions, including length, width and thickness, are generally governed by the intended use, and power is typically provided by a two-way, variable speed power unit, which powers hydraulic actuators to drive the floor slats.

A typical live floor unloading cycle proceeds as follows: In the first cycle stroke, all slats move in unison. This is a conveying movement. At the end of the first stroke, a first set of slats, comprising every third slat, moves under the load, but the load remains stationary. Next, a second set of every third slat moves under the load. Again, the load remains stationary. Finally, a third set of every third slat moves under the load, and again, the load remains stationary. The cycle is then repeated with all of the slats moving in unison to convey the load. Used in this manner and operated at demonstrated efficient speeds, unloading a typical 45-foot trailer with a live floor takes only a few minutes.

Exemplary systems enjoying broad market acceptance and commercial success include the Keith WALKING FLOOR®, made by Keith Mfg. Co of Madras, Oreg., and the HALLCO WALKING FLOOR® and Hallco LIVE FLOORS® made by Hallco Mfg. Company, Inc., of Tillamook, Oreg. These systems, when installed in a trailer, provide for the loading and unloading of a number of materials, including the bulk goods identified above. Such installations and use have been shown to reduce trailer floor cleaning time, destination dock turnaround time, payload cross contamination, cargo damage, and fuel consumption, while improving worker, material flow, productivity and throughput. And because a trailer tipper and an unloading hopper are not needed to offload cargo, a trailer equipped with a live floor allows the unloading of numerous kinds of material. Furthermore, trailers can be loaded from the top, rear end, and side. [WALKING FLOOR® is a registered trademark of R. Keith Foster, d.b.a. Keith Mfg. Co., of Madras Oreg. HALLCO WALKING FLOOR and LIVE FLOORS® are registered trademarks of Hallco Manufacturing Company, of Tillamook, Oreg.]

Exemplary prior art patents include U.S. Pat. No. 5,560,472, to Gist, which teaches a seal/bearing arrangement for a walking floor or conveyor system intended to prevent the inadvertent passage of particulate material through the floor members and into the area beneath the floor members.

Other instructive references include U.S. Pat. No. 5,325,957, to Wilken, which shows a live floor having continuous bearings that shield their contact surface on floor slats from liquid and other material or materials which are thrown toward the bottom of the floor slats and the continuous bearings.

U.S. Pat. No. 5,222,593, to Quaeck, discloses a reciprocating floor conveyor having a supporting frame, base members on the supporting frame, side-by-side slidable slats mounted slide on the base members, and hydraulic power system with flow regulators to provide a sequential retraction of the slat groups in a longitudinal reciprocative movement.

Also of interest are U.S. Pat. Nos. 4,896,761 and 4,858,748, to Foster, and U.S. Pat. No. 5,560,472, each of which, like the foregoing patents, discloses and teaches a solution to the problem of particulate materials dropping into the spaces between the side-by-side moving slats of a reciprocating live floor. This problem results in the loss of bulk material, the accumulation of particulate material in the spaces below the floor (and sometimes in machine parts), and eventually an undermining of floor system function.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. The general structural and operational elements of each of the foregoing references are considered well known and are incorporated in their entirety by reference herein.

However, it is respectfully submitted that none of the above-indicated patents disclose, teach, suggest, show, or otherwise render obvious, either singly or when considered in combination, the invention described and claimed herein. In particular, none of the foregoing systems provides a trailer with a live floor capable of hauling two different bulk materials. Accordingly, when there is a need to transport and deliver two different bulk commodities in loads comprising less than half a trailer of material, the materials are loaded into two different trailers that were either hauled separately or at one time in a double-trailer configuration. This prevents the two materials from mixing and contaminating one another. There thus remains the need to provide a trailer having a live floor which makes it possible to transport two different bulk commodities in a single haul.

BRIEF SUMMARY OF THE INVENTION

The present invention is a semi-trailer divided into front and rear compartments by a selectively removable partition which provides a barrier between the front and rear compartments and thus allows for the segregation of bulk particulate material during loading, transportation, and unloading. In a first preferred embodiment the inventive trailer is an open top bulk material trailer. However, the trailer may be any of a number of trailer types, including open top, dry freight van (with either roll up doors or door on hinges), refrigerated van, storage van, and the like. The shared feature of all trailer types is that they include substantially continuous, contiguous side barriers, which include a front side, right and left sides, and an openable rear door or doors of some kind.

The inventive trailer includes independently operated front and rear moving slat reciprocating conveyors (live floors), one each disposed in the respective front and rear compartments. Each live floor has a dedicated drive unit and a corresponding hydraulic power system with flow regulators, and a timing cylinder, as are well known. The storage or container compartments associated with each floor unit are selectively partitioned to keep the commodities separated until unloading is completed for one of the bulk materials. The present invention therefore makes it possible to transport two different bulk commodities in a single haul and still benefit from the loading/unloading capabilities of a live floor. Accordingly, the challenges of negotiating traffic with a double-trailer are avoided; the need to find the increasingly scarce driver with a special double trailer rating is obviated; fuel consumption is reduced, driver time is cut in half, and delivery time is reduced.

It is therefore an object of the present invention to provide a new and improved semi-trailer capable of storing and transporting two different kinds of bulk materials.

It is another object of the present invention to provide a new and improved dual-compartment trailer, wherein at least one of the compartments, and preferably both, includes a live floor.

A further object or feature of the present invention is a new and improved bulk material semi-trailer that increases fuel economy by eliminating the need for multiple trips to transport more than one kind of bulk material.

An even further object of the present invention is to provide a novel bulk material storage and transport trailer that eliminates the need for double trailer transport of two kinds of bulk material.

A still further object of the present invention is to provide a semi-trailer that eliminates the need for a driver having a special license for hauling double trailers.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 2A is a cross sectional side view in elevation of the inventive trailer loaded with two distinct types of bulk commodity;

FIG. 2B cross-sectional side view in elevation showing the beginning of the unloading cycle for the rear compartment only;

FIG. 3A is a cross-sectional side view in elevation showing the rear compartment fully emptied and the partition separating the front from the rear compartment raised for commencing unloading of the front compartment;

FIG. 3B shows the commencement of a cycle for unloading the front compartment.

Figure 1:
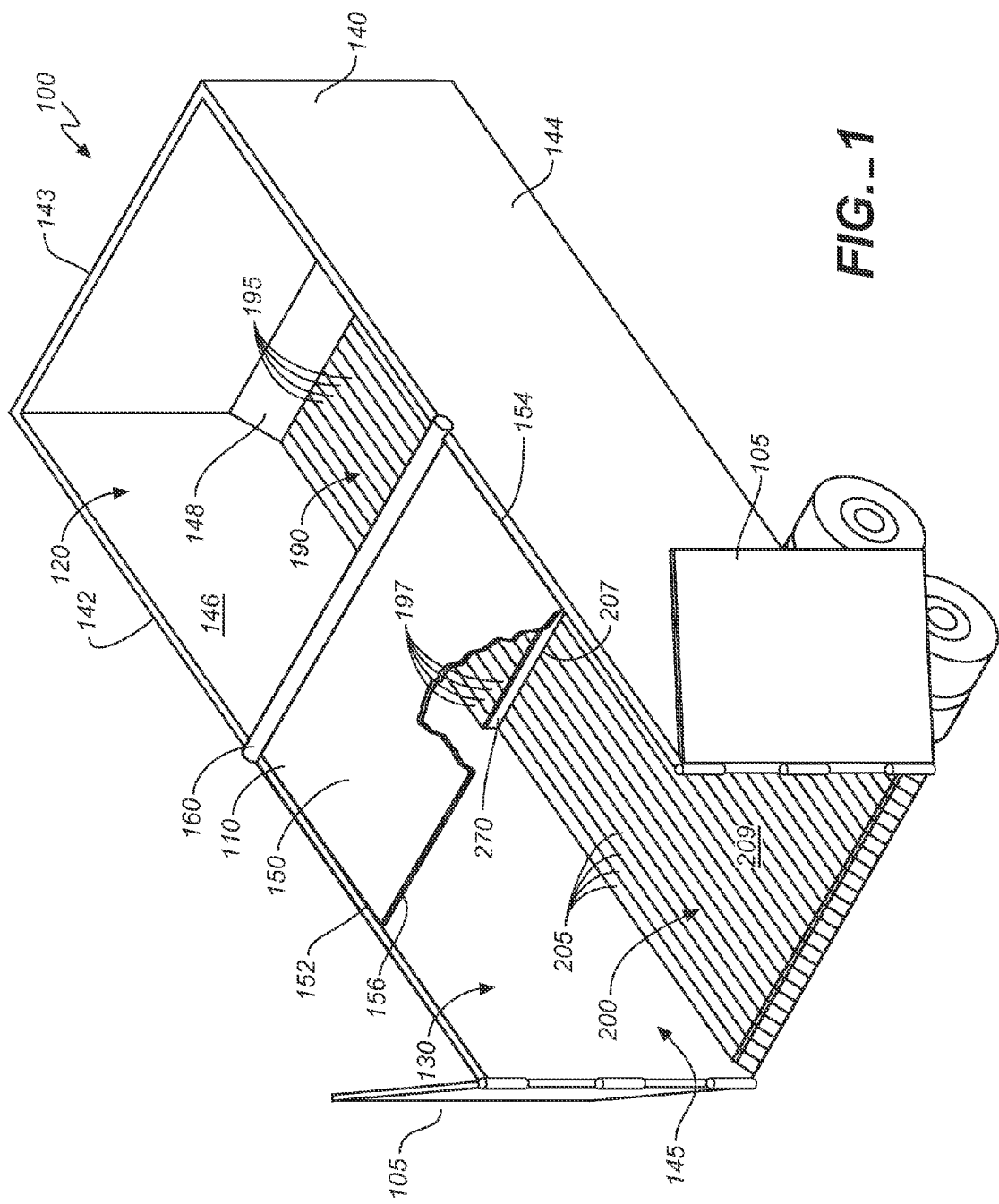
FIG. 1 is perspective view showing the bifurcated trailer with front and rear moving slat reciprocating conveyors of the present invention.

DRAWING REFERENCE NUMBER LEGEND 100 preferred embodiment of inventive trailer
105 trailer doors
110 partition
120 front storage compartment
130 rear storage compartment
140 overall storage compartment (combined front and rear)
142 right side of trailer
143 front side of trailer
144 left side of trailer
145 the back end of trailer
146 interior side of trailer
148 front ramp
150 partition panel
152 right edge of partition
154 left edge of partition
156 bottom edge of partition
160 transverse cross member
170 bulk commodity
180 bulk commodity
190 front moving slat reciprocating conveyor (live floor)
195 front live floor reciprocating slats
197 rear ends of front floor reciprocating slats
199 bottom surface of front live floor
200 rear moving slat reciprocating conveyor (live floor)
205 rear live floor reciprocating slats
207 front ends of rear live floor reciprocating slats
209 upper surface of rear live floor
210 front drive unit
220 rear drive unit
230 front hydraulic actuator
240 rear hydraulic actuator
250 partition down position
260 partition up position
270 floor separator tube (threshold)

DETAILED DESCRIPTION OF THE INVENTION

Referring to FIGS. 1 through 3A, wherein like reference numerals refer to like components in the various views, there is illustrated therein a new and improved semi-trailer, generally denominated 100 herein. Each of the figures illustrates features of the preferred embodiment of the invention. Collectively, these views show that the inventive apparatus is a dual compartment, bifurcated trailer, divided generally in half by a partition 110 into front and rear storage compartments, 120, 130, respectively. Together the front and rear compartments define the larger storage compartment 140 of a typical open top bulk material semi-trailer, and the container portion of the trailer includes a right side 142, a front side 143, a left side 144. A rear door or doors 105 complete the overall container barriers and provide a selectively openable back end of the trailer. As will be appreciated by those with skill in the art, the doors may comprise side-by-side hinged doors (as shown), a roll up door, or a drop down ramp door, or any of a number of suitable closure devices that provide a selectively openable barrie which prevents material from escaping the back end 145 of the trailer, and when opened allows unloading of bulk material from at least the lower portion of the trailer proximate and immediately above the trailer floor of the rear compartment. The front compartment 120 preferably includes a front ramp 148 angled downwardly from the front side 143 and terminating in an edge spaced apart from, but proximate to, the front compartment live floor. The front ramp encourages bulk material to fall rearwardly, away from the front side, and onto the front compartment live floor. The lower edge of the ramp is slightly spaced apart from the reciprocating slats of the front live floor so as to permit the slat movement and to provide a space into which the slats may move during use. The lower edge of the ramp may include weather stripping or another suitable flexible barrier to prevent migration of particulate material underneath the front ramp.

The compartment partition 110 preferably comprises a panel 150 pivotally hung from, or hinged on, a transverse cross member or bar 160 extending between the right and lefts sides of the trailer and thus spanning the upper width of the trailer. The panel is sized and may further be provided with flexible rubber barriers (such as weatherstripping) to provide a close fit between its right and left side edges, 152, 154, and the interior sides 146 of the trailer, as well as between its lower edge 156 and the floor of the trailer. The panel may be secured or fixed in a down (closed) position, in which event it divides the trailer into front and rear storage compartments and provides a barrier that prevents materials contained in either or both the front and rear compartments from migrating into the other compartment (FIGS. 2A, 2B). Alternatively, the partition may be secured in an up (open) position when loading or unloading the front compartment or when loading, storing, or transporting only a single bulk material (FIGS. 1, 3B). As with the rear door, the partition may take any of a number of suitable types, including the pivoting panel described above, or, alternatively, a single side-hinged door, a double door with side hinges, a tri-fold door with a single side hinge, a roll up door, and so forth.

When secured in the down position (FIGS. 2A, 2B), the partition allows the trailer to be filled in only one compartment (either front or rear) or to be filled with two distinct bulk commodities, 170, 180, one commodity in each of the front and rear compartment.

The trailer further includes front and rear moving slat reciprocating conveyors (live floors) 190, 200, each including a plurality of longitudinally reciprocating slats 195, 205, respectively. Each floor also has a dedicated drive unit, front drive unit 210, and rear drive unit, 220, respectively, though in an alternative preferred embodiment, a single drive unit for both front and rear systems could be employed. Each drive unit is operatively connected to a system of hydraulic actuators, 230, 240, front and back, respectively, for moving the floor slats of the moving slat reciprocating conveyor.

FIGS. 2A through 3B show the intended uses of the inventive system. FIG. 2A shows the inventive trailer fully loaded with two distinct types 170, 180, of bulk commodity. In FIG. 2B, the unloading process has begun. In these views, the rear doors of the trailer (105 in FIG. 1, but shown removed in FIGS. 2A through 3B) are opened and the floor 200 of the rear compartment 130 has completed its first stroke in beginning of the unloading cycle for the rear compartment only. As described above, the stroke cycles continue until the rear compartment is fully unloaded. Only the rear drive unit is operated during the unloading of the rear compartment.

FIG. 3A is a cross sectional side view in elevation showing the rear compartment fully emptied. When it is desired to unload the front compartment 120, the partition 150 is raised from its down position 250 and affixed in an up position 260. The front and rear drive units 210, 220, are then operated simultaneously. Material is moved continuously from the front compartment rearward and into the rear compartment as material is moved longitudinally from the front floor 190 and onto the rear floor 200; the reciprocating slats 205 of the rear floor 200 then continue moving the bulk material rearward in the unloading process until all of the bulk commodity is satisfactorily unloaded out the open back end 145 of the trailer.

In order to facilitate easy transfer of material from the front live floor to the rear live floor, 190, 200, and to prevent the loss of small particulate material below the floors, the floors may include interlacing slats, or in a preferred embodiment, the entire front live floor is positioned slightly above the level of the rear live floor, such that the rear ends 197 of the front floor slats 195 are disposed slightly above (i.e., slightly overlap) and slide over the front ends 207 of the rear floor slats 205. In a preferred embodiment, the bottom surface 199 of the front live floor is disposed above and reciprocatingly slides over a floor separator tube or threshold 270, while the upper surface 209 of the rear live floor is disposed below and reciprocatingly slides under the separating tube. The floor separator tube and/or the floor surfaces may be provided with a rubber barrier or other gasket material (again, a weatherstripping type barrier) to further prevent migration of bulk material underneath the front live floor.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. A dual-compartment trailer having a right side, a left side, and a front side, said trailer comprising:
    a front storage compartment having a front live floor that; includes reciprocating slats with rear ends and a bottom side;
    a rear storage compartment having a rear live floor including reciprocating slats having front ends and an upper side, and wherein said rear ends of said front live floor reciprocating slats are disposed above said front ends of said rear live floor reciprocating slats;
    a selectively movable partition having a closed position and an open position for selectively dividing said front compartment from said rear compartment and providing a barrier between said front compartment and said rear compartment such that bulk material in either compartment is prevented from migrating into the other of said compartments;
    at least a first and second power drive unit with the first power drive unit operatively connected to said front live floor and said second power drive unit operatively connected to said rear live floor for actuating the movement of said front an rear live floors; and
    at least one selectively openable rear door.

2. The trailer of claim 1, further including a floor separator disposed between and proximate to said rear end of said front live floor reciprocating slats and said front ends of said rear live floor reciprocating slats.

3. A method of storing, transporting, and unloading two or more different kinds of bulk material, said method comprising the steps of:
    (a) providing a semi-trailer having a front storage compartment with a front live floor and a rear storage compartment with a rear live floor, a selectively movable partition having a closed position and an open position for selectively dividing the front compartment from the rear compartment and providing a barrier between the two compartments, at least a first and second power drive unit with the first power drive unit operatively connected to said front live floor and said second power drive unit operatively connected to said rear live floor and at least one selectively openable rear door;
    (b) loading at least a first kind of bulk material into the front compartment;
    (c) placing the selectively movable partition in the closed position such that the first and any second bulk material loaded in the rear compartment are prevented from migrating from their respective compartments into the other compartment;
    (c) loading at least a second kind of bulk material in the rear compartment;
    (d) transporting the bulk materials using a trailer tractor; and
    (e) unloading the semi-trailer by first opening the rear door, next activating the power drive for the rear live floor and continuing until the second bulk material is unloaded from the trailer, then placing the partition into the open position, then either activating the power drive for the front and rear live floors in order or simultaneously until the front compartment is unloaded from the trailer.

* * * * *